United States Patent [19]
Audiffred et al.

[11] 3,972,401
[45] Aug. 3, 1976

[54] SLIPPING CLUTCH CONTROLS RESPONSIVE TO WHEEL SLIP

[75] Inventors: Sidney J. Audiffred, Washington; David W. Bump; Raymond N. Erkkila, both of Morton; Lowell E. Johnson; Shairyl I. Pearce, both of East Peoria, all of Ill.

[73] Assignee: Caterpillar Tractor Co., Peoria, Ill.

[22] Filed: July 11, 1974

[21] Appl. No.: 487,487

Related U.S. Application Data

[62] Division of Ser. No. 382,717, July 26, 1973, Pat. No. 3,896,910.

[52] U.S. Cl............................ 192/109 F; 192/56 F; 251/285
[51] Int. Cl.² ....................................... F16D 25/00
[58] Field of Search............. 192/109 F, 3.37, 3.33, 192/85 R, 56 F

[56] References Cited
UNITED STATES PATENTS

| | | | |
|---|---|---|---|
| 2,275,204 | 3/1942 | Smirl | 192/103 FA |
| 2,702,619 | 2/1955 | Andershock | 192/56 F X |
| 3,351,169 | 11/1967 | Mc Indoe | 192/85 R |
| 3,352,392 | 11/1967 | Black et al. | 192/3.57 |
| 3,621,955 | 11/1971 | Black | 192/3.57 |
| 3,680,398 | 1/1972 | Schneider | 192/3.57 X |

*Primary Examiner*—Benjamin W. Wyche
*Attorney, Agent, or Firm*—Phillips, Moore, Weissenberger, Lempio & Strabala

[57] ABSTRACT

A control system for a vehicular drive train including a slipping clutch for proportioning power from a prime mover to implements and a primary output shaft of the vehicle including a manual control conditioned by a manual selector to vary engagement of the slipping clutch through a regulating valve in a first mode of vehicle operation and to regulate acceleration of the prime mover in a second mode of vehicle operation. Additional elements of the control system include an adjustable wheel slip sensing mechanism preferably associated with the manual control, a bypass valve associated with the regulating valve and preferably with a hydraulically operable transmission in the drive train for maintaining at least limited engagement of the slipping clutch in order to prevent or limit reverse rotation of components within a torque converter coupled with the slipping clutch and an input valve also associated with the transmission to condition the slipping clutch for receiving a substantial portion of shock loading applied to the drive train.

5 Claims, 13 Drawing Figures

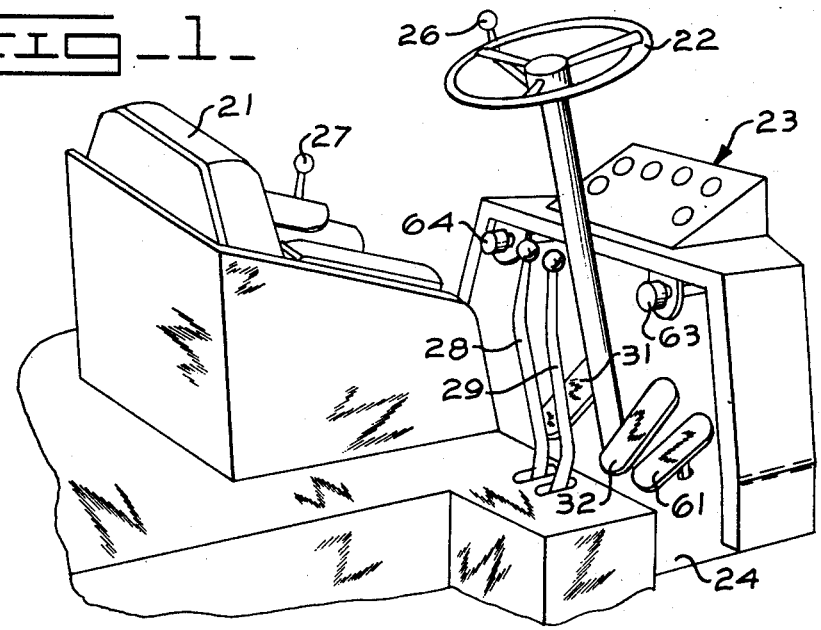
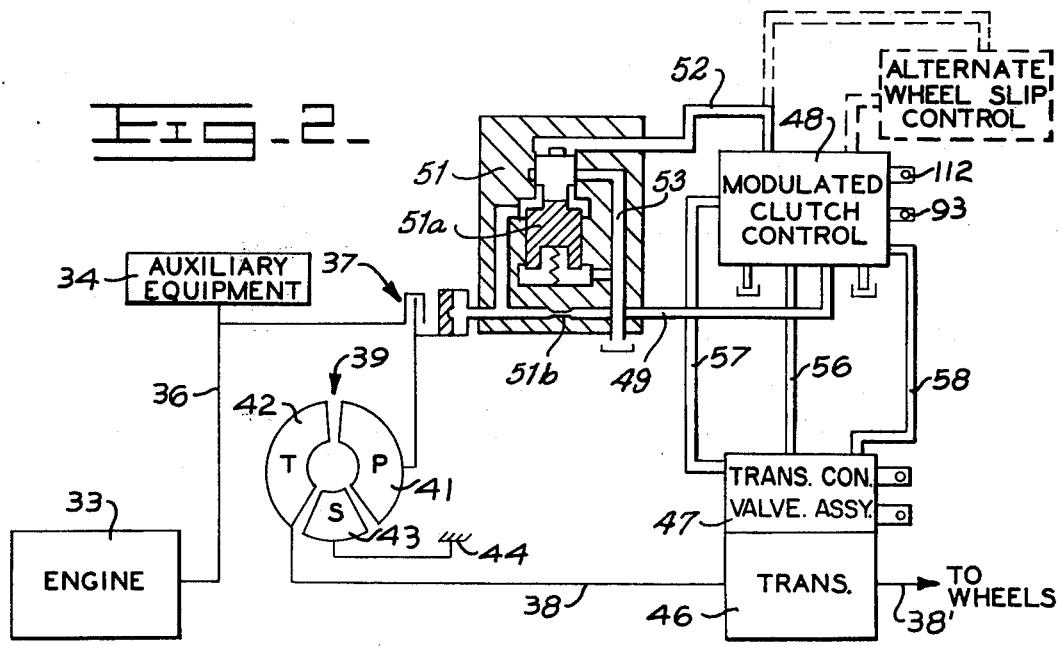

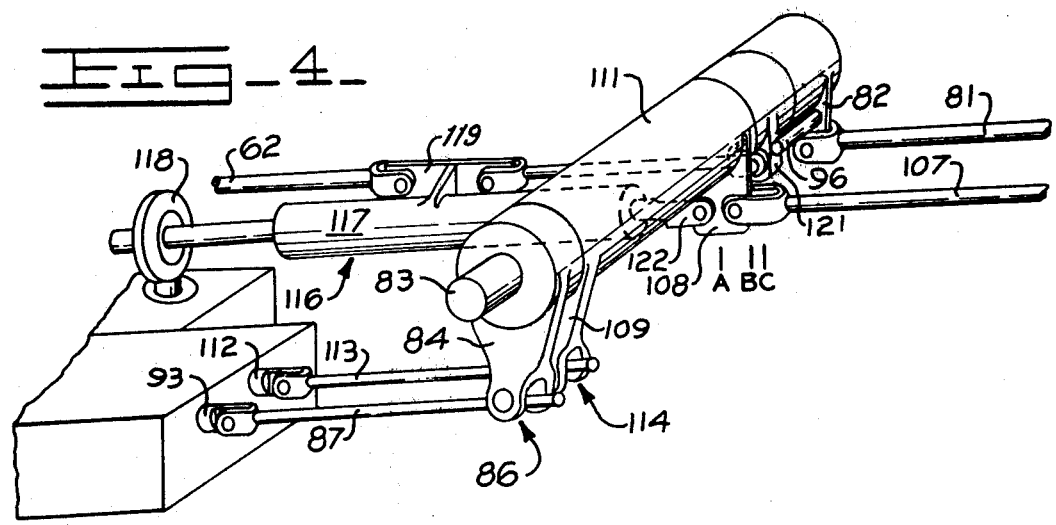
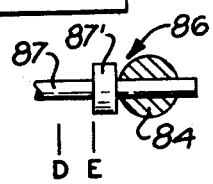
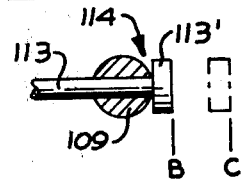
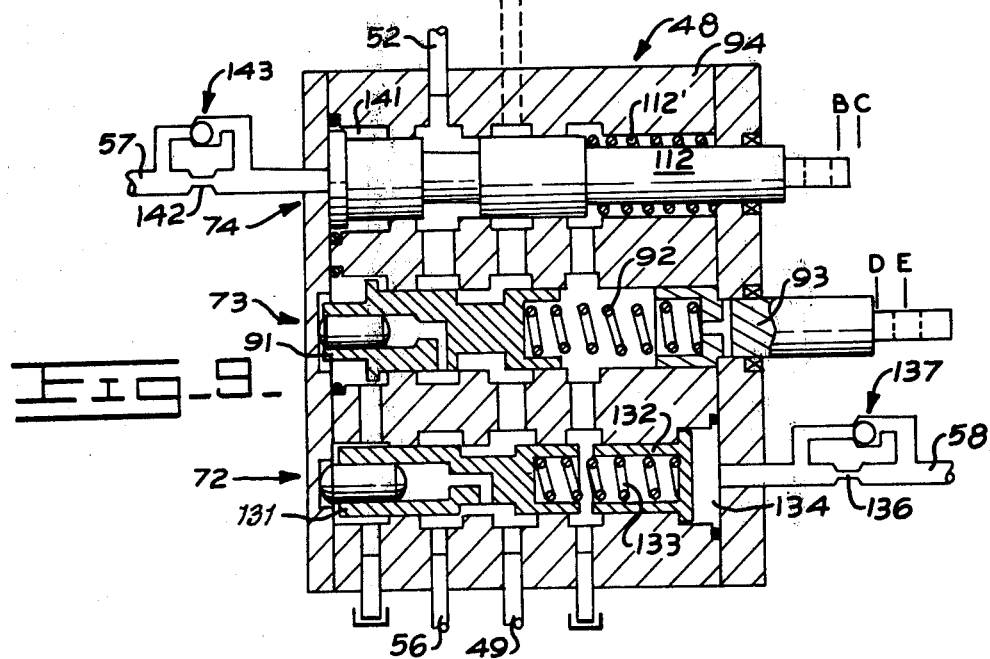

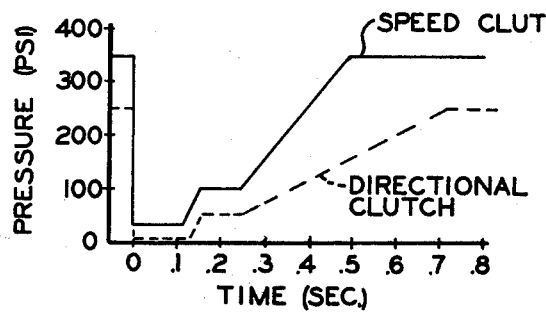
Fig-10-
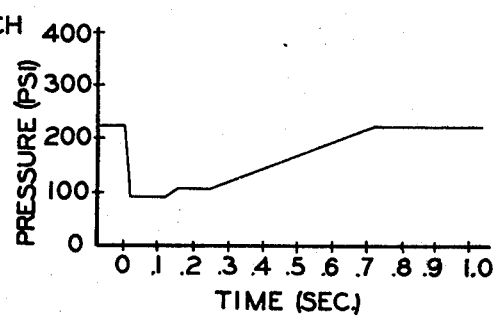
Fig-11-
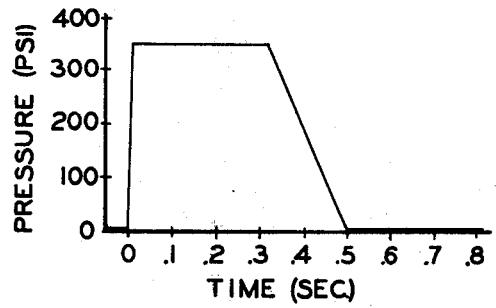
Fig-12-
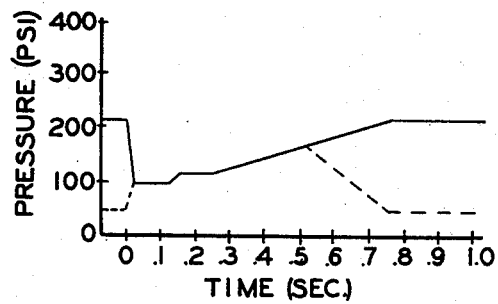
Fig-13-

SLIPPING CLUTCH CONTROLS RESPONSIVE TO WHEEL SLIP

This is a division of Ser. No. 382,717, filed July 26, 1973, and now U.S. Pat. No. 3,896,910.

BACKGROUND OF THE INVENTION

The present invention relates to control systems for vehicular drive trains and more particularly vehicles wherein power from a prime mover must be proportioned by the drive train between driven ground wheels of the vehicle and auxillary equipment or implements.

Vehicles employed for earth-moving or material handling operation such as bucket loaders, for example, commonly present the problem of proportioning power from a single prime mover or vehicle engine to the driven ground wheels of the vehicle and also to auxillary equipment or implements such as the bucket on a loader vehicle. It is desirable to provide full power to the vehicle ground wheels during transport operations in order to provide maximum pulling power for the vehicle and to minimize travel time. In other phases of vehicle operation where useful work is being performed by the implements, it is generally desirable to provide maximum power to the implements. However, in many situations, it is necessary to move the vehicle during operation of its implements. Under such circumstances, power from the vehicle engine must be delivered in proper proportion to both the implements and the ground wheels. Slipping clutches and/or torque converters have commonly been employed in the vehicle drive train to perform this proportioning fuction.

An example of such diverse performance requirements for a single vehicle may be readily seen in connection with a bucket loader. In one type of operation, the vehicle may be employed to load material from a stockpile onto a closely adjacent truck. To achieve maximum efficiency, the bucket controls must have full power available to position the bucket as rapidly as possible. In addition, the vehicle itself must move between the stockpile and the truck. In other operations, the loader vehicle may be required to travel extended distances between loading and unloading sites at which time there is a maximum power requirement for its ground wheels.

The speed of operation for the bucket of a loader was initially found to be the limiting factor particularly in a close operating cycle between a stockpile and adjacent truck. Accordingly, it was necessary for the operator to frequently stop the vehicle until the bucket was raised to a sufficient height for dumping its load into the truck. This problem was solved in part by proper selection and sizing of the vehicle engine, its drive train components such as the torque converter and hydraulic circuitry for operating the implement.

Even with such developments, there remains a need to more closely match the vehicle capability with diverse types of operation as described above. One approach to overcoming this problem was the use of torque converters with variable blading providing a proportioning capability of the type discussed above. However, such systems did not commonly provide for full adjustment by the operator. For example, adjustment might be available in low speed ranges of the vehicle. Further, such systems did not generally provide for closely matching the vehicle with widely diverse operating conditions.

Accordingly, there remains a need for control systems to more accurately match the capabilities of a vehicular drive train with operating requirements under widely diverse conditions as discussed above and to improve response of the engine or prime mover. Further, it remains generally desirable to achieve economy both in the size of the vehicle engine, for example, and relative simplicity in the drive train and its control system. It is further desirable to provide such a drive train and control system which minimizes tire slippage since the tire replacement costs for such vehicles are very substantial.

SUMMARY OF THE INVENTION

To overcome one or more of the problems discussed above, the present invention provides a novel dual purpose control system for drive train including slipping clutch means for proportioning power between auxillary equipment and a primary output shaft, including a manual control which may be conditioned by a manual selector means to regulate engagement of the slipping clutch means in a first mode of operation, and to regulate acceleration of a prime mover associated with the drive train in a second mode of operation.

Other components of the control system which may be employed in various combinations with each other and with the dual control arrangement discussed above include an adjustable wheel slip sensing mechanism which is preferably associated with the manual control to provide a feedback signal when a selected level or torque is being transferred through the slipping clutch means and which may more preferably be overridden by the manual control, means preferably associated with a transmission in the drive train to condition the slipping clutch means for receiving a substantial portion of shock loading applied to the drive train and means for increasing engagement of the slipping clutch means during transitory condition of the transmission to prevent or limit reverse rotation within a torque converter coupled with the slipping clutch means.

Additional functions and advantages of the present invention are made apparent in the following description having reference to the accompanying drawings.

Accordingly, the present invention provides for different modes of operation in a vehicle at the instant selection of an operator through a relatively simple control system to increase operating efficiency of the vehicle. Further, available power of the vehicle engine or prime mover is more fully employed under diverse operating conditions with improved response characteristics. An operator may readily limit wheel slip even under different operating conditions to minimize tire wear. The vehicle engine can be designed more economically since it does not absorb full shock loading during gear changes.

BRIEF DESCRIPTION OF THE DRAWINGS

FIG. 1 is a fragmentary view of an operator's station for a vehicle of the types with which the present invention may be employed;

FIG. 2 is a generally schematic representation of a drive train and control system for such a vehicle according to the present invention;

FIGS. 3 and 4 taken together represent a linkage arrangement for interconnecting manual controls disposed in the operator's station with various portions of the control system for the drive train;

FIGS. 7 and 8 are enlarged, fragmentary views of lost motion connections for coupling the linkage of FIG. 4 with selected portions of the control system;

FIG. 9 is a sectioned view of a valve assembly for regulating engagement of a slipping clutch in the drive train of FIG. 2; and FIGS. 10–13 graphically represent pressure traces occurring in various portions of the control system during operation as discussed in greater detail below.

DETAILED DESCRIPTION OF THE INVENTION

Figure 3:
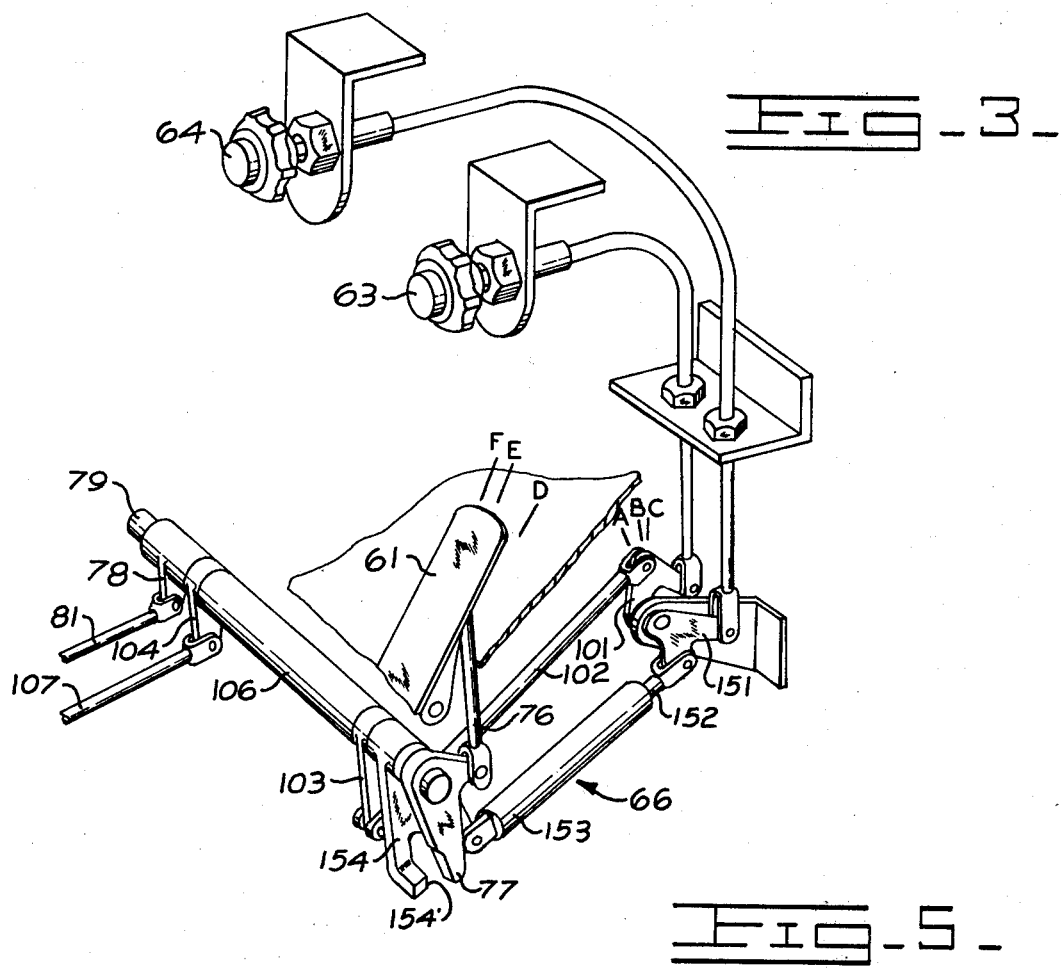

FIGS. 1 and 2 respectively illustrate an operator's station and the drive train for a vehicle such as an earth-moving or material handling machine which may particularly be a bucket loader for example. Following a brief description of the operator's station and the drive train, certain major features of the invention are summarized followed by a more detailed description of the drive train in combination with a dual purpose control system according to the present invention and operation thereof.

Referring now to FIG. 1, the operator's station include a seat 21, a conventional steering wheel 22, an instrument panel 23 and a deck 24. Transmission controls may include a single lever 26 or the lever 26 in combination with another lever 27 with the lever 26 providing for forward and reverse operation and the lever 27 providing speed range selection.

Control levers 28 and 29 provide means for regulating operation of auxillary equipment associated with the vehicle. For example, with the vehicle being a bucket loader, the levers 28 and 29 may respectively provide for lift and tilt control over the bucket. Conventional brake and brake/transmission neutralizer pedals 31 and 32 are provided on opposite sides of the steering column. The above elements are generally conventional and provide a preferred environment for the present inventin while not being a critical part thereof.

Referring momentarily to FIG. 2, the drive train represented therein include a prime mover or engine 33 which is basically the sole source of power for both the ground wheels of the vehicle and auxiliary equipment associated with the vehicle. As shown in FIG. 2, auxiliary equipment or implements indicated at 34 are directly coupled to a power input line 36 which is interconnected between the prime mover 33 and a portion of a slipping clutch indicated at 37. Another portion of the slipping clutch 37 is coupled with a power output line 38 preferably through a torque converter indicated at 39. In the preferred embodiment shown by FIG. 2, the torque converter includes an impeller 41 coupled with the slipping clutch 37, a turbine member 42 coupled with a power output line 38 and a stator member 43 which may be grounded to a housing 44 for the torque converter. Here again, the particular configuration of the torque converter is not critical to the present invention. Except for one particular feature of the invention as discussed below, the torque converter could even be omitted from the drive train with the slipping clutch being coupled directly with the power output line 38 for the purposes of the present invention.

The power output line 38 is coupled with at least one driven ground wheel for the vehicle through a transmission indicated at 46. The transmission 46 typically includes a variety of directional and speed range gears, the engagement of which is controlled by a plurality of hydraulically operable clutches (not shown), the transmission clutches being regulated by a transmission control valve assembly indicated at 47. Construction details for such a transmission and transmission control valve assembly are generally conventional constructions as may be seen for example by reference to U.S. Pat. Nos. 3,091,976; 3,096,667; 3,386,540; and 3,389,770, these patents being assigned to the assignee of the present invention.

The slipping clutch 37 is subject to variable engagement, primarily under the control of a valve assembly indicated at 48 to provide for the transfer of variable amounts of torque between the input line 36 and the output line 38. The slipping clutch thus serves to proportion power from the prime mover 33 between the auxiliary equipment 34 and the power output line 38 or primary output shaft 38' which drives one or more ground wheels of the vehicle.

The valve assembly 48 which is described in greater detail below, preferably includes means for selectively delivering actuating fluid pressure to the slipping clutch 37 through an inlet conduit 49. A hydraulically responsive centrifugal valve 51 rotates with a portion of the slipping clutch during operation of the drive train and is in responsive communication with the valve assembly 48 through a conduit 52 to provide for variable adjustment of fluid pressure in the inlet conduit 49 and thus regulate the degree of engagement for the slipping clutch 37. The centrifugal valve 51 may be of the type shown in FIG. 2 for regulating communication between the inlet conduit 49 and a drain passage 53. Such a centrifugal valve is shown for example in FIGS. 17 and 19 in U.S. Pat. No. 3,352,395 issued to C. R. Hilpert on Nov. 14, 1967. The conventional centrifugal valve of FIG. 2 has a spring-loaded spool 51a which is urged upwardly as viewed in FIG. 2 by centrifugal force to communicate the inlet conduit and the slipping clutch with the drain passage 53. Fluid pressure from the conduit 52 urges the spool downwardly, for example, toward the position shown in FIG. 2. However, fluid communication between the inlet conduit 49 and the drain passage 53 is normally maintained by the spool 51a through the opposing action of centrifugal force and fluid pressure from the conduit 52. The spring load on the spool assists in moving it upwardly to open the drain passage 53 when the centrifugal valve is rotating at relatively low speed. An orifice 51b restricts flow from the inlet conduit 49 to the slipping clutch 37 so that the centrifugal valve need not dump full line flow from the conduit 49 in order to control actuating pressure within the slipping clutch 37. However, it is noted that the centrifugal valve may also be designed to compensate for coefficient of friction changes in the modulating clutch 37 in order to overcome the effect of wear within the clutch dynamic versus static condition, as well as temperature and lubrication conditions. A centrifugal valve of this type provides for adjustment of pressure in the inlet conduit 49 in response to a pressure control signal from the conduit 52 to achieve a substantially straight line relationship between output of the slipping clutch 37 and control pressure in the conduit 52.

The valve assembly 48 is in fluid communication with the transmission control valve assembly 47 through conduits 56, 57, and 58 to provide a responsive relationship as described in greater detail below.

Figure 5:
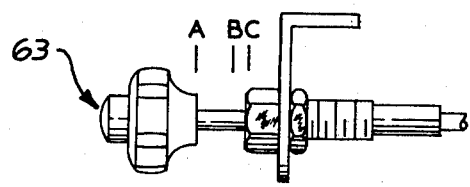
FIG. 5 is an enlarged, fragmentary view of a manual selector control which is also illustrated in FIGS. 1 and 3.

To summarize the relatively important features of the present invention, having reference initially to both FIGS. 1 and 2, a dual purpose manual control or foot pedal 61 (see FIG. 1) is coupled with a portion of the valve assembly 48 through a linkage arrangement illustrated in FIGS. 3 and 4 and with an accelerator control element 62 (see FIG. 4). The element 62 may for example be conventionally coupled with a governor (not shown) for the engine 33. A selector control knob 63 (see FIG. 1) is also associated with the linkage arrangement of FIGS. 3 and 4 to adjust the association of the manual control pedal 61 with the control valve assembly 48 and accelerator control element 62 respectively. Having momentary reference also to FIG. 5, the selector control 63 may be placed at a first setting indicated at A whereby the manual control pedal 61 is conditioned for regulating or modulating engagement of the slipping clutch 37 through the valve 48 in a first mode of vehicle operation. Preferably, the accelerator control element 62 of FIG. 4 is adjusted for substantially full throttle operation of the engine 33 in the first mode of operation. The selector control knob 63 may also be moved to a second setting indicated at B wherein the manual control pedal 61 is conditioned to regulate operating speed of the engine 33 through the accelerator control means 62 in a second mode of vehicle operation. In the second mode of operation, the valve 48 is preferably conditioned for substantially full engagement of the slipping clutch 37. It will be apparent that the first mode of operation discussed above provides for full power operation of the auxillary equipment 34 with the slipping clutch 37 being operable to proportion or deliver a certain amount of torque from the engine to the vehicle ground wheels. The second mode of operation refers to a condition suitable for transport operation of the vehicle where the slipping clutch 37 is fully engaged and the operator controls speed of the engine 33 through the same pedal 61 in order to vary ground speed of the vehicle. The selector control knob 63 may also be moved to a position C for shutting down the engine 33.

Figure 6:
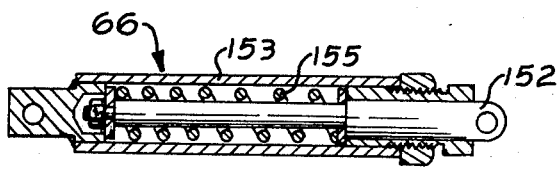
FIG. 6 is an enlarged view with parts in section, of a portion of a wheel slip limiting mechanism associated with a manual control as illustrated in FIG. 3.

Wheel slip limiting or control means could be employed in communication with the control conduit 52 and the valve assembly 48 employed in the manner shown for example by FIGS. 6 and 16 of U.S. Pat. No. 3,478,621, also assigned to the assignee of the present invention. However, wheel slip limiting means for the present invention are preferably embodied by a mechanism associated with the manual control pedal 61 as may be best seen by reference to FIGS. 3 and 6. The wheel slip limiting means preferably includes a manually adjustable knob 64 providing for variable interaction with the pedal 61 through an element 66. Through this arrangement, which is also described in greater detail below, the transfer of a preselected level of torque through the slipping clutch is sensed by the vehicle operator through the manual control pedal 61 itself and the control pedal 61 is further capable of overriding operation to further increase torque delivery through the clutch if so desired.

Referring also to FIG. 9 which illustrates the valve assembly 48 in greater detail, fluid under pressure from the transmission control valve assembly 47 is delivered to the valve assembly 48 through the conduit 56 and selectively communicated to the inlet conduit 49 by an input valve 72. Fluid pressure in the inlet conduit 49 is also communicated to a regulating valve 73 and a bypass valve 74 which provides for parallel communication of fluid pressure to the control conduit 52. The regulating valve 73 is operatively coupled with the manual control pedal 61 through the linkage arrangement of FIGS. 3 and 4 while the bypass valve 74 is effectively coupled with the selector control knob 63 through the same linkage arrangement.

The association of the conduit 57 from the transmission control valve assembly 47 with the bypass valve 74 maintains at least limited engagement of the slipping clutch 37 under certain operating conditions as discussed in greater detail below. Also, the association of fluid from the transmission control valve assembly 47 through the conduit 58 with the input valve 72 conditions the slipping clutch to absorb a substantial portion of shock loading in the drive train illustrated in FIG. 2 as is also discussed in greater detail below.

To describe the above noted features of the invention in greater detail, having reference to FIGS. 3 and 4 initially, the manual control pedal 61 is connected through a rod 76 with a bell crank lever 77 which in turn is connected to another lever 78 by a rotatable shaft 79. The lever 78 is connected by a rod 81 with a lever 82 which is secured by a rotatable shaft 83 with another lever 84. The lever 84 is coupled by means of a lost motion connection 86, also shown in FIG. 7, to a rod 87.

Referring also to FIG. 9, the regulating valve 73 includes a reducing valve spool 91 associated by means of a spring 92 with a load piston 93 which projects from a housing 94 for the valve assembly 48 and is connected with the rod 87 as shown in FIG. 4. A projection 96 on the lever 82 provides a lost motion connection with the accelerator control element 62 in a manner described in greater detail below.

The selector control knob 63 is coupled through a bell crank 101 (See FIG. 3) with a rod 102. Lever 103 is connected with the rod 102 and with another lever 104 by means of a tube 106 rotatably surrounding the shaft 79. Referring also to FIG. 4, the lever 104 is connected by a rod 107 with a lever 108 which is secured to a lever 109 by a tube 111 rotatably mounted upon the shaft 83.

Referring also to FIG. 9, the bypass valve 74 includes a slidable spool 112. Referring particularly to FIG. 4, the spool 112 is connected through a rod 113 to the lever 109 by means of a lost motion connection 114 which is also illustrated in FIG. 8.

The linkage interconnection between the lever 108, the projecting pin 96 on the lever 82 and the accelerator control element 62 includes a compressible link 116 having a housing 117 supported in a stationery bearing 118 and secured to an interconnecting link 119 arranged between the accelerator control element 62 and a separately rotatable lever 121 arranged upon the shaft 83 for interaction with the projecting pin 96. A rod portion 122 of the link 116 is internally coupled with the housing 117 by means of a spring (not shown) and is also secured to the lever 108.

Referring now to FIG. 9, the input valve 72 of the valve assembly 48 includes a reducing valve spool 131 for metering fluid from the supply conduit 56 to the inlet conduit 49. As noted above, the regulating valve spool 91 and the bypass valve spool 112 provide parallel fluid paths for communicating actuating fluid from the inlet conduit 49 with the control conduit 52 which is in communication with the centrifugal valve 51 of FIG. 2.

A load piston 132 interacts with the input reducing valve spool 131 through a spring 133 and has an actuating chamber 134. The chamber 134 is in communication with the conduit 58 both through a restrictive orifice 136 and a one way check valve 137 providing a relatively free return passage for fluid from the actuating chamber 134. Similarly, an actuating chamber 141 for the bypass valve spool 112 is in communication with the conduit 57 through both a restrictive orifice 142 and a one way check valve 143 permitting relatively free passage of fluid from the conduit 57 to the chamber 141.

DUAL CONTROL OPERATION

As noted above, the present invention permits the single manual control pedal 61 to regulate operation of the drive train of FIG. 2 in two different modes. With the selector knob 63 (See FIGS. 3 and 5) in its A position, the manual control 61 may be depressed to adjust the degree of engagement for the slipping clutch 37 of FIG. 2. With the selector knob 63 in its B position, depression of the manual control pedal 61 serves to regulate acceleration of the engine 33. Operation of the control system and drive train for the first mode of operation is described immediately below followed by a description of the manner of operation for the control system and drive train in the second mode.

For modulated operation of the slipping clutch 37 in the first mode, the selector knob 63 is moved to its A position. Through the linkage arrangement described above, the lever 108 (See FIG. 4) is moved in a clockwise direction to a position indicated at A where the rod 122 bears directly upon the housing 117 to move the link 119 and accelerator control element 62 in a leftward direction as seen in FIG. 4 to a position corresponding with substantially full throttle operation of the engine 33 (See FIG. 2). The link 119 also moves the lever 121 in a clockwise direction so that it does not interact with the projecting pin 96 during subsequent operation of the manual control pedal 61. Having reference also to FIG. 8 and 9, it may be noted that the lever 109 moves away from the flange 113' on the rod 113 when the selector knob 63 is moved to its A position. Because of the lost motion connection 114, the bypass valve spool 112 remains free for response to fluid pressure in the actuating chamber 141.

Under the conditions described above, having reference to FIGS. 3, 4, 7 and 9, the manual control pedal 61 interacts with the regulating valve 73 through the linkage arrangement to cause variable engagement of the slipping clutch 37. As the pedal 61 is depressed, the lever 84 is shifted in a clockwise direction against a flange 87', on the rod 87. When the load piston 93 is shifted in a leftward direction as viewed in FIG. 9, it acts through the spring 92, causing the regulating valve spool 91 to shift leftwardly and admit increasing fluid pressure to the control conduit 52.

Referring momentarily to FIG. 2, the transmission control valve assembly 47 includes means (not shown) for establishing a constant fluid pressure, for example, 350 psi which is communicated to the valve assembly 48 through the conduit 56. It may also be noted that the transmission control valve assembly also preferably includes means (not shown) for controlling fluid communication to the torque converter 39 of FIG. 2. The transmission control valve assembly 47 also communicates fluid signals to the valve assembly 48 through the conduit 57 and 58 in a manner described in greater detail below.

As was noted above, the input reducing valve spool 131 regulates communication between the conduit 56 and the inlet conduit 49 for the slipping clutch.

Operation of the control system and drive train under different conditions for the transmission 46 and transmission control valve assembly 47 is set forth below.

During steady state operation of the transmission with its gears remaining in other than a Neutral condition, the load piston 32 is shifted leftwardly by fluid pressure communicated through a conduit 58 from the transmission control valve assembly 47. The input valve spool 131 is accordingly shifted in a leftwardly direction to supply full actuating pressure, for example 225 psi, to the inlet conduit 49 for the slipping clutch. Prior to depression of the control pedal 61, it may be noted that regulating valve 73 communicates fluid from the conduit 49 to the control conduit 52 at a nominal pressure of 40 psi. The fluid pressure in the inlet conduit 49 is permitted to flow to drain by the centrifugal valve 51 so that the slipping clutch 37 remains substantially unengaged. As the pedal 61 is depressed through its E position toward its D position, the load piston 93 is also shifted leftwardly against the spring 92. The regulating valve spool 91 accordingly admits increasing fluid pressure into the control conduit 52, for example, through the range of 40 psi to 225 psi, the centrifugal valve 51 being responsive to this increased pressure for causing increased engagement of the slipping clutch 37.

Under steady state conditions with the transmission 46 remaining in Neutral, the transmission control valve assembly does not communicate a fluid signal through the conduit 58 so that the load piston 132 remains in a rightwardly shifted position with the input reducing valve spool 131 providing only a nominal fluid pressure, for example, 90 psi to the inlet conduit 49. The regulating valve 73 accordingly is limited to providing a variable input pressure to the control conduit 52, for example, in the range of 40 psi to 90 psi.

Under transient conditions of the transmission 46, when a gear change is being effected by the transmission control valve assembly 47, engagement of the slipping clutch 37 is again increased by pressurization of the control conduit 52 through operation of the bypass valve 74 in a manner described below. However, with respect to the input valve 72, it is noted that the restriction 136 causes a delay in response of the load piston 132 to fluid pressure in the conduit 58. Thus, fluid pressure is allowed to increase from 90 psi to 225 psi in inlet conduit 49 by the input valve spool 131 in delayed proportion to a preselected transient pressure trace in a clutch in transmission 46 so that shock loading which arises in the drive train is absorbed in large part by the slipping clutch 37. This feature allows the numerous clutches in the transmission to be relatively smaller in size since they are subject to less shock loading.

Fluid pressure in the inlet conduit 49 is graphically represented by FIG. 11 under such conditions. Normally in a transient condition of the transmission 46, where a directional shift is being accomplished by the transmission control valve assembly 47, it would be possible for the turbine 42 of the torque converter 39 in FIG. 2 to rotate for a short period of time in a relatively reverse direction. The terms "transient" and "transitory" as used herein, are specifically intended to refer to conditions where pressurization of a combination of clutches engagable to establish a selected drive path through the transmission, is interrupted, for example, during a change of gears. Under these circumstances, if the actuating pressure supplied to the slipping clutch 37 were low, for example 40 psi, the slipping clutch might also rotate in reverse, resulting in an extremely high energy shift upon reengagement of the slipping clutch.

This condition is prevented or minimized by response of the bypass valve spool 112 to fluid pressure in its actuating chamber 141. During such transient conditions of the transmission 46, a fluid signal is delivered from the transmission control valve assembly 47 through the conduit 57 to the actuating chamber 141. The check valve 143 allows this override signal to freely enter the chamber 141 so that the bypass spool 112 is immediately shifted towards the right as seen in FIG. 9 to communicate fluid pressure into the control conduit 52 with the centrifugal valve 51 slightly increasing the minimum engagement of the slipping clutch in the event that control pedal 61 is in position E. The increased engagement of the slipping clutch corresponding to a predetermined minimum pressure level (e.g. 90 psi), provides a more positive drive coupling through the drive train which prevents reverse operation of the type described above. The bypass valve spool 112 is again shifted leftwardly upon completion of the shift to the position shown in FIG. 9 by its spring 112' to subject the slipping clutch 37 to the pressure controlled by regulating valve 73. FIG. 12 graphically illustrates pressure in the actuating chamber 141. It may be noted that the relatively gradual slope of the pressure drop illustrated in FIG. 12 is due to the restrictive orifice 142.

A particular operating condition where the hydraulic response of the bypass valve spool 112 is of importance may be seen by having reference to FIG. 13 which represents fluid pressure in the control conduit 52. If the control pedal 61 is completely released by the operator, fluid pressure in the conduit 52 could drop at the end of a shift period for the transmission, along the dotted line illustrated in FIG. 13 to permit a minimum actuating pressure in the slipping clutch, for example, of 40 psi. Fluid pressure in the actuating chamber 141 is extended so that increased engagement of the slipping clutch continues until the vehicle has decelerated to a safer speed by engagement of the transmission 46, for example.

When the selector knob 63 is moved to its B position for the second mode of vehicle operation, having reference to FIGS. 3, 4, 8, and 9, the lever 109 is moved in a counterclockwise direction by the linkage arrangement and acts against the flange 113' to shift the byypass spool 112 in a rightwardly direction as viewed in FIG. 9 in order to provide constant communication between the inlet conduit 49 and the control conduit 52. Accordingly, the slipping clutch is subject to substantially full engagement when a fluid signal is communicated to the actuating chamber 134 from the conduit 58 as discussed above, the input reducing valve spool 131 responding to that fluid signal for communicating full actuating pressure from the conduit 56 to the inlet conduit 49 and accordingly the control conduit 52.

Also, as the selector knob 63 is moved to its B position, the lever 108 is rotated in a counterclockwise direction to its B position and the spring in the compressible link shifts the lever 121 generally against the projecting pin 96. Accordingly, depression of the control pedal 61 results in accelerator control of the engine through the element 62 because of the interaction allowed between the pin 96 and lever 121.

Accordingly, in steady state operation of the transmission 46, where it remains in other than Neutral gear, the slipping clutch is engaged by full actuating pressure, for example 225 psi. During a transient shift, however, fluid pressure in the actuating chamber 134 drops and then rises in proportion to the pressure trace indicated generally by the broken line on FIG. 10 until the reducing valve spool 131 meters the full actuating pressure into the inlet conduit 49. Movement of the manual control pedal 61 does not affect the engaged condition of the slipping clutch.

In steady state operation of the transmission 46, when it remains in Neutral gear, the slipping clutch is engaged at a nominal pressure for example 90 psi, in anticipation of a gear shift by the transmission control valve assembly 47.

The load piston 132 remains in a rightwardly shifted position since fluid pressure is not communicated through the conduit 58 when the transmission is in Neutral. Accordingly, the reducing valve spool 131 meters a nominal fluid pressure, for example 90 psi, into both inlet conduit 49 and the control conduit 52 since the bypass valve spool 112 is shifted rightwardly by the selector knob 63 as discussed above.

In a transient condition of the transmission where a gear change is being caused by the transmission control valve assembly, the slipping clutch is engaged generally together with the clutches in the transmission. However, because of the restriction 136, the slipping clutch is fully engaged only after substantial engagement of the transmission clutches so that shock loading in the drive train tends to be picked up in large part by the slipping clutch.

WHEEL SLIP LIMITING MECHANISM

As noted above, the drive train and control system of the present invention are susceptible to use with a wheel slip control of the type illustrated in phantom on FIG. 2. However, the present invention is preferably contemplated and including wheel slip limiting means comprising the manual control knob 64 of FIGS. 1 and 3 together with the compressible link 66 also shown in FIGS. 3 and 6. Referring particularly to FIGS. 3 and 6, the control knob 64 is coupled through a bell crank 151 with a rod 152 which is interconnected with the cylinder 153 by a spring 155. The cylinder 153 is also coupled with a lever 154 which is preferably rotatable upon the shaft 79 and includes a stop 154' arranged for interaction with the lever 77 and accordingly the manual control pedal 61.

During the first mode of operation, where the manual control pedal 61 adjusts engagement of the slipping clutch through the regulating valve 73, the wheel slip limiting combination provides adjustable means for delivering a feedback signal to the operator when a selected level of torque is being transferred through the slipping clutch. As the pedal 61 is depressed, the lever 77 engages the stop 154' and the compressible link 66 provides increased resistance to further depression of the pedal 61. The actual point of engagement between the lever 77 and stop 154' may be readily adjusted by the operator through positioning of the selector knob 64. Accordingly, engagement between the lever and stop 154' may be readily adjusted to coincide with an observed condition of tire slippage as might occur for example during the loading phase of a loader vehicle of the type described above. The spring interconnection between the cylinder 153 and rod 152 readily permits further depression of the control pedal 61 to override the wheel slip limiting mechanism without changing the initial point of engagement between the lever 77 and stop 154' during subsequent operation.

The control system of the present invention has been described above with reference to a power crain having a primary output shaft coupled to a driven ground wheel. However, the invention is also applicable to drive trains for other vehicles, for example, a marine gear where the primary output shaft of the power train is a propeller shaft and the auxiliary equipment driven by a common prime mover may comprise winches for hauling in nets and the like.

What is claimed is:

1. A hydraulic control system for a power train, the power train proportioning power from a prime mover to auxiliary equipment and a primary output shaft, the power train including an input means coupling the prime mover with the auxiliary equipment, an output means operatively coupled with the primary output shaft and a slipping clutch means providing a variable coupling between the input and output means, comprising adjustable valve means for hydraulically regulating engagement pressure of the slipping clutch means, manual control means coupled with the valve means for adjustment thereof and slip indicating means comprising resilient abutment means engaged by said manual control means only after it has moved a predetermined distance for providing a feedback signal when a selected level of torque is being transferred through the slipping clutch means, the abutment means including means for resisting operation of the manual control means after it has moved said predetermined distance to indicate the selected level of torque transfer and manually adjustable means separate from said manual control means for varying the position of said abutment means and thereby varying the clutch engagement pressure and the selected level of torque transfer.

2. The control system of claim 1 wherein the slip indicating means yieldingly resists operation of the manual control means to permit its being overridden by the manual control means.

3. The control system of claim 2 wherein the slip indicating means comprises two relatively movable members coupled by spring means, one of the members being connected to the manually adjustable means, the other member being arranged for interaction with the manual control means.

4. The control system of claim 1 wherein the valve means comprises an input valve means for communicating actuating fluid through an inlet conduit to the slipping clutch means and a regulating valve operatively coupled to the manual control means and with the clutch inlet conduit to adjust pressure of the actuating fluid communicated to the slipping clutch.

5. The control system of claim 4 wherein a torque converter means provides a coupling between the slipping clutch and the output means.

* * * * *